(12) United States Patent
Yao (10) Patent No.: US 12,304,302 B2
(45) Date of Patent: May 20, 2025

(54) TWO-STAGE SPEED-CHANGE OUTPUT DEVICE AND ELECTRIC VEHICLE USING SAME

(71) Applicant: Li-Ho Yao, Taipei (TW)

(72) Inventor: Li-Ho Yao, Taipei (TW)

( * ) Notice: Subject to any disclaimer, the term of this patent is extended or adjusted under 35 U.S.C. 154(b) by 272 days.

(21) Appl. No.: 17/984,268

(22) Filed: Nov. 10, 2022

(65) Prior Publication Data

US 2023/0150355 A1    May 18, 2023

(30) Foreign Application Priority Data

Nov. 16, 2021    (TW) .................................. 110142642

(51) Int. Cl.
| | | |
|---|---|---|
| *B62M 11/16* | (2006.01) | |
| *B60B 27/00* | (2006.01) | |
| *B60K 7/00* | (2006.01) | |
| *B60K 17/04* | (2006.01) | |
| *F16H 3/00* | (2006.01) | |
| *F16H 3/66* | (2006.01) | |

(52) U.S. Cl.
CPC ........ *B60K 17/046* (2013.01); *B60B 27/0021* (2013.01); *B60K 7/0007* (2013.01); *F16H 3/005* (2013.01); *B60K 2007/0092* (2013.01); *B62M 11/16* (2013.01); *F16H 2200/0021* (2013.01); *F16H 2200/0034* (2013.01); *F16H 2200/2007* (2013.01); *F16H 2200/201* (2013.01); *F16H 2200/2084* (2013.01); *F16H 2200/2087* (2013.01)

(58) Field of Classification Search
CPC ...... B62M 6/65–6/75; B62M 11/16–18; F16H 2200/2084–2092; F16H 2200/202–2028; F16H 3/663–3/666
See application file for complete search history.

(56) References Cited

U.S. PATENT DOCUMENTS

| | | | | |
|---|---|---|---|---|
| 6,387,008 | B1 * | 5/2002 | Chen ...................... | B62M 11/16 475/296 |
| 9,039,563 | B2 * | 5/2015 | Lin .......................... | F16H 3/005 475/297 |
| 2007/0191177 | A1 * | 8/2007 | Nagai ..................... | F16H 3/005 475/291 |
| 2010/0304913 | A1 * | 12/2010 | Su .......................... | F16H 3/005 475/151 |

(Continued)

*Primary Examiner* — Ernesto A Suarez
*Assistant Examiner* — Lillian T Nguyen
(74) *Attorney, Agent, or Firm* — Leong C. Lei (57) ABSTRACT

A two-stage speed-change output device includes a main axle, on which a motor assembly and first and second speed-change assemblies are mounted. The first and second speed-change assemblies are mounted inside an output shell by first and second one-way clutching elements, both operating in a forward direction. The motor assembly is operable to rotate backward to drive the first one-way clutching element to drive the output shell to rotate in the forward direction, while the second one-way clutching element idles. The motor assembly is also operable to rotate forward to drive the second one-way clutching element to drive the output shell to rotate in the forward direction, while the first one-way clutching element idles. The device realizes speed change for two stages to drive the output shell in the same direction with forward and backward rotations of the motor assembly.

6 Claims, 10 Drawing Sheets

(56) References Cited

U.S. PATENT DOCUMENTS

2012/0083376 A1\*  4/2012  Lo .......................... B62M 6/65
                                                    475/149
2022/0135179 A1\*  5/2022  Lee ....................... B62J 45/413
                                                    180/206.6

\* cited by examiner

TWO-STAGE SPEED-CHANGE OUTPUT DEVICE AND ELECTRIC VEHICLE USING SAME

TECHNICAL FIELD OF THE INVENTION

The present invention relates generally to the technical field of speed change for electric vehicles.

DESCRIPTION OF THE PRIOR ART

Small electric vehicles are primarily power-assisted bicycles or electric bicycles, of which a driving source involves a motor assembly that is operable to drive wheels. Generally, the motor assembly is mounted on a vehicle frame and is connectable, by means of an output wheel (which can be a toothed wheel or a frictional wheel), with a transmission assembly arranged on a crankshaft (of a power-assisted bicycle) or a vehicle wheel hub (of an electric vehicle), so as to fulfill the purpose of assisted driving. Since the motor assembly and the transmission assembly are arranged separately, the number of the assemblies is large, occupying a large space, and inevitably increasing costs and difficulty of fabrication, and also adding vehicle loading and causing additional consumption of energy.

Further, to conduct speed change in order to handle different traveling situations, such as high speed low torque (on a flat road) or low speed high torque (on an upslope or carrying high load), the electric vehicle may be necessarily and additionally equipped with a speed change mechanism coupled to an output spindle of the motor assembly, and a speed change control unit is involved to conduct switching between various speeds. This further increase the number of components and the space occupied thereby, and also adds control wiring. And, in addition to the above problems, this also increase the probability of damage and requirement for servicing. This invention is made to address the above problems of an excessively large number of components and a large spaced occupied thereby.

SUMMARY OF THE INVENTION

The primary objective of the present invention is to provide a two-stage speed-change output device, which realizes speed change of two stages by making use of forward and reverse rotations of a motor, exhibiting an effectiveness of easy operation.

Further, a second objective of the present invention is to provide an electric vehicle that uses a two-stage speed-change output device, in which the two-stage speed-change output device occupies a relatively small amount of space and is applicable to driving and speed changing for a small-sized electric vehicle, realizing great enhancement of the utilization thereof.

DETAILED DESCRIPTION OF THE PREFERRED EMBODIMENT

Figure 1:
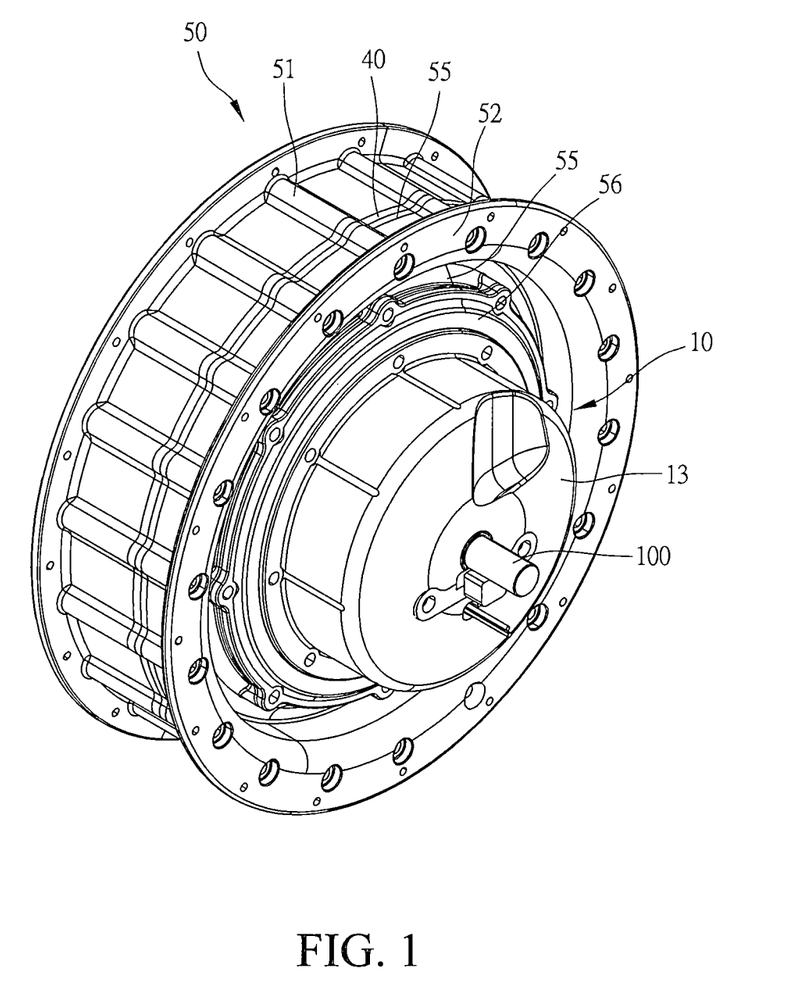
FIG. 1 is a perspective view of the present invention.
Figure 2:
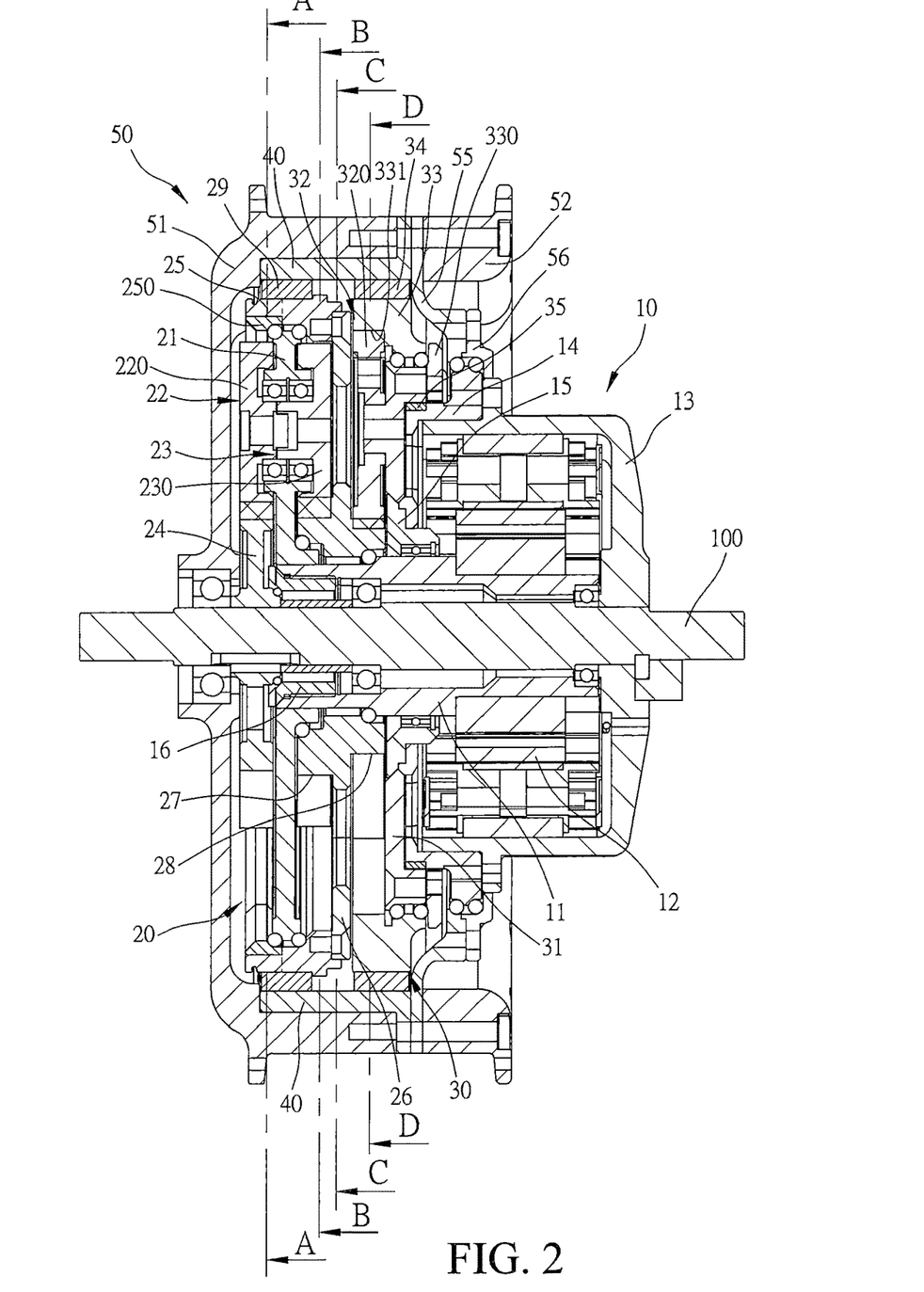
FIG. 2 is a cross-sectional view showing relationships among various components thereof.

A two-stage speed-change output device according to the present invention is constructed as shown in FIGS. 1 and 2, and comprises a main axle 100, a motor assembly 10, a first speed-change assembly 20, a second speed-change assembly 30, and an output shell 40. The motor assembly 10 is operable to drive and rotate the first speed-change assembly 20 in a reverse or backward direction and to drive and rotate the second speed-change assembly 30 in a forward direction to allow the first and second speed-change assemblies 20, 30 to individually drive the output shell 40 in the same direction, so that the two-stage speed-change output device may carry out switching for two-stage speed change by using the forward and backward rotations of the motor assembly 10.

Figure 5:
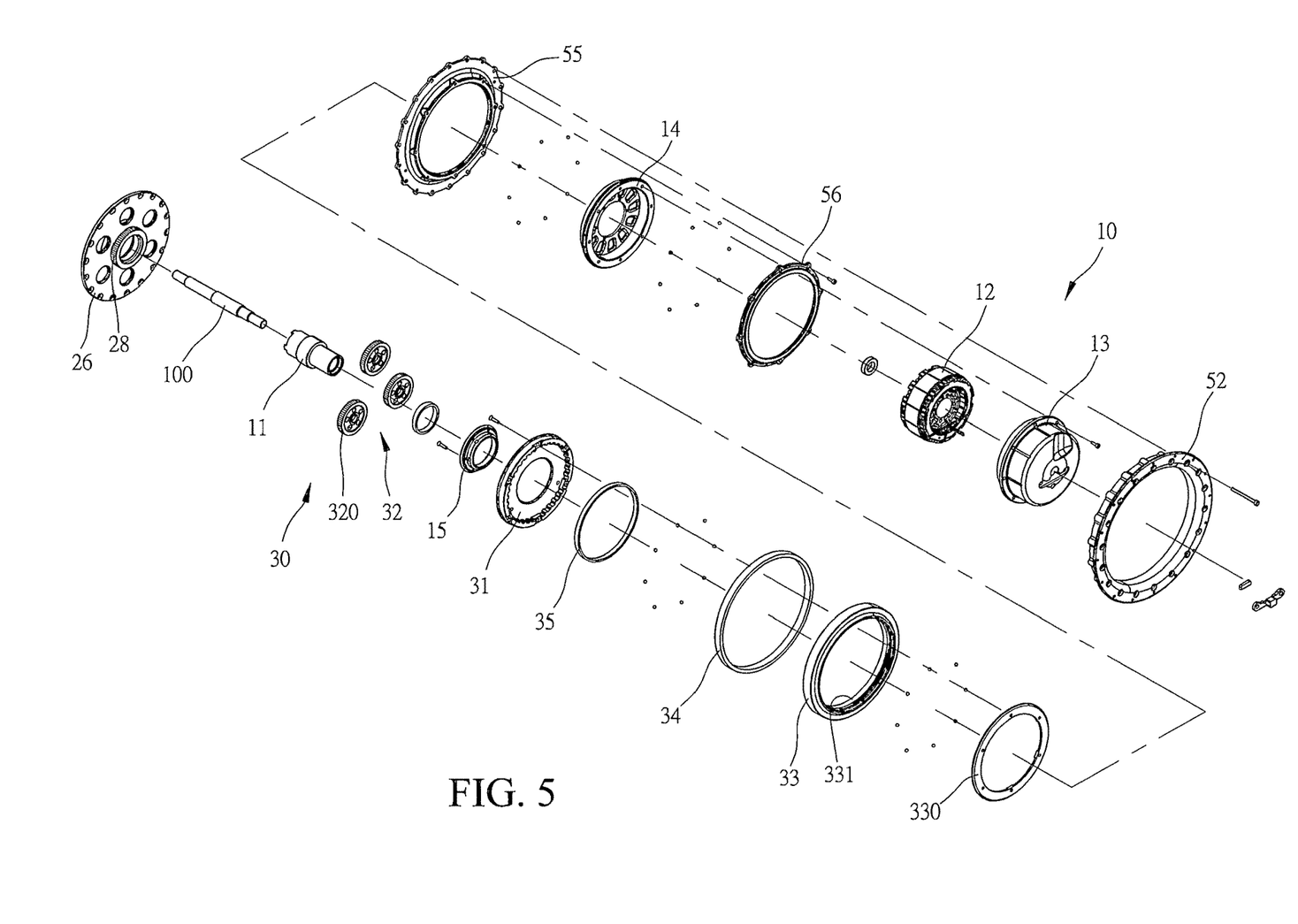
FIG. 5 is an exploded view showing components and configurations of a second speed-change assembly of the present invention.

With regards to a detailed structure of the two-stage speed-change output device, reference is made to FIGS. 2 and 5. The motor assembly 10 includes a main axle 100 on which an input sleeve 11 is rotatably mounted by means of a plurality of bearings. An electromagnetic mechanism 12 is mounted to an end of the input sleeve 11, so that the electromagnetic mechanism 12, when electrified and energized, and thus excited, drives the input sleeve 11 to rotate forward and backward relative to the main axle 100. Further, the motor assembly 10 comprises an external motor housing 13 mounted on the main axle 100 at an outer side of the electromagnetic mechanism 12, and the motor assembly 10 comprises an internal motor housing 14 arranged at an inner side of the electromagnetic mechanism 12 to be combined with the external motor housing 13, wherein an axle seat 15, which is rotatably mounted on the input sleeve 11, is fit in and mounted to a center of the internal motor housing 14, so that the input sleeve 11 extends through and projects out of the internal motor housing 14 to drive the first and second speed-change assemblies 20, 30.

Figure 3:
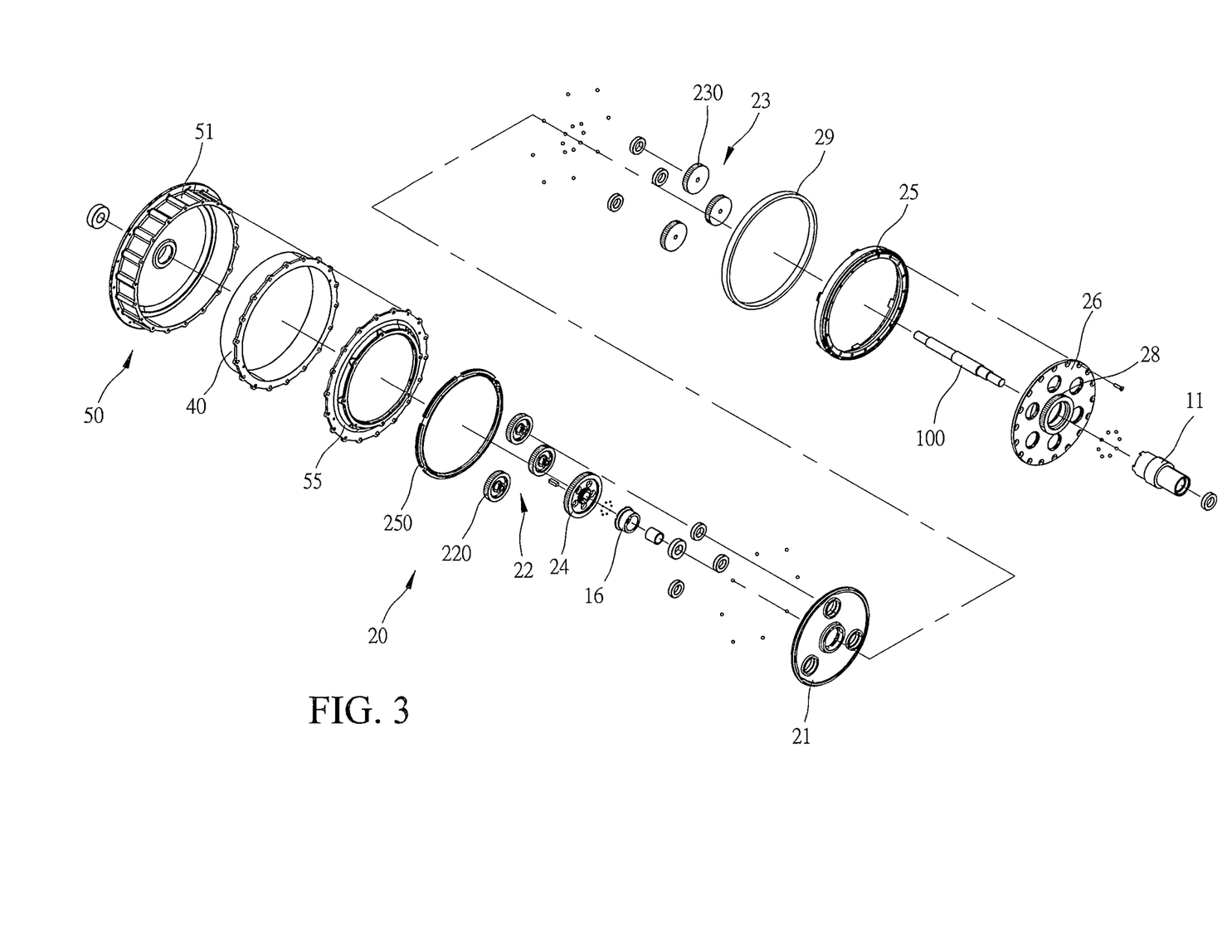
FIG. 3 is an exploded view showing components and configurations of a first speed-change assembly of the present invention.
Figure 4:
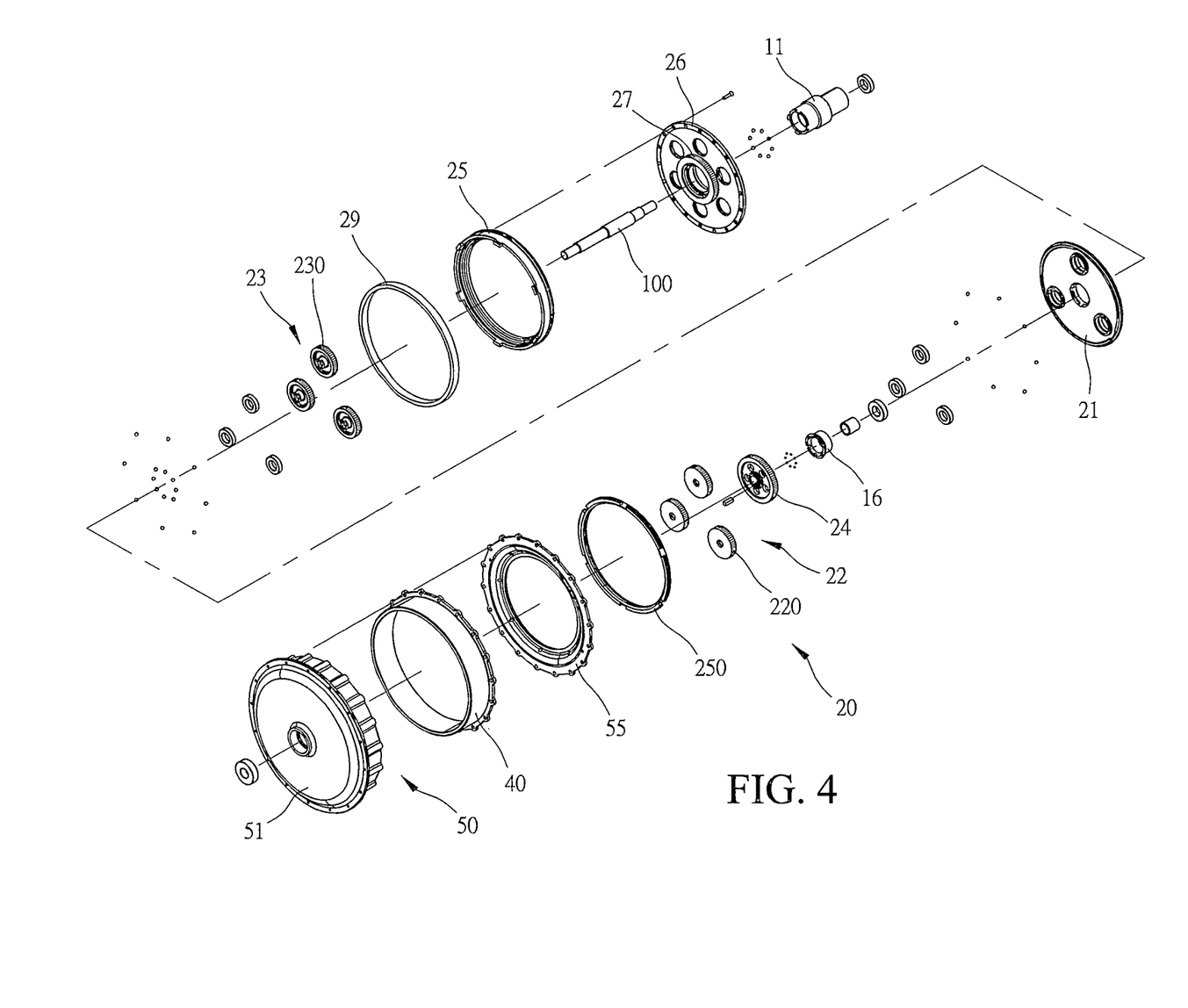
FIG. 4 is an exploded view, taken from a different angle, showing the components and configurations of the first speed-change assembly of the present invention.
Figure 7:
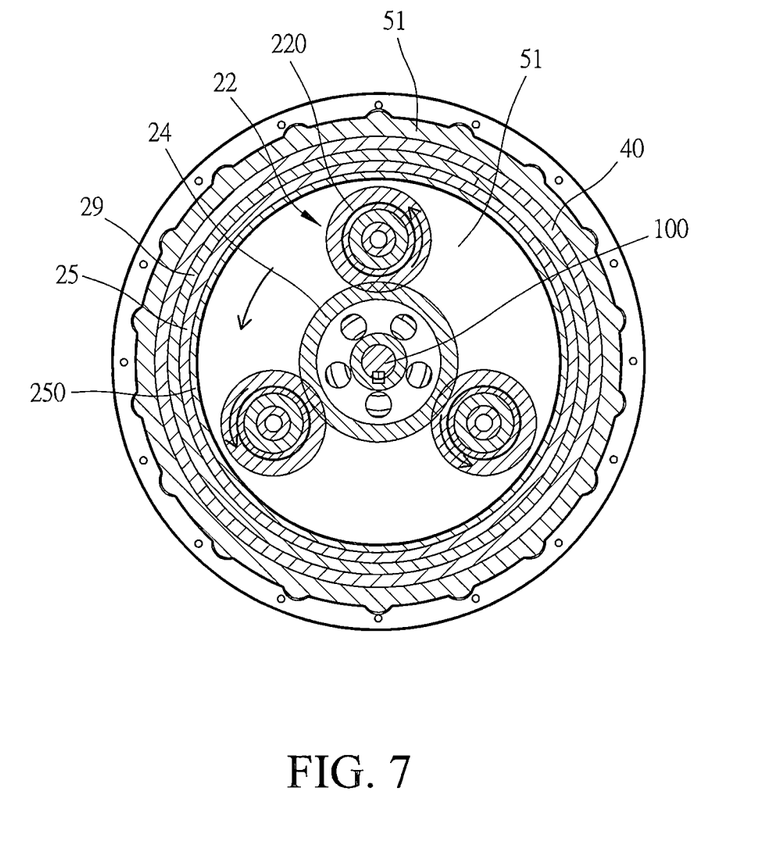
FIG. 7 is a cross-sectional view of present invention, taken from line A-A of FIG. 2.
Figure 8:
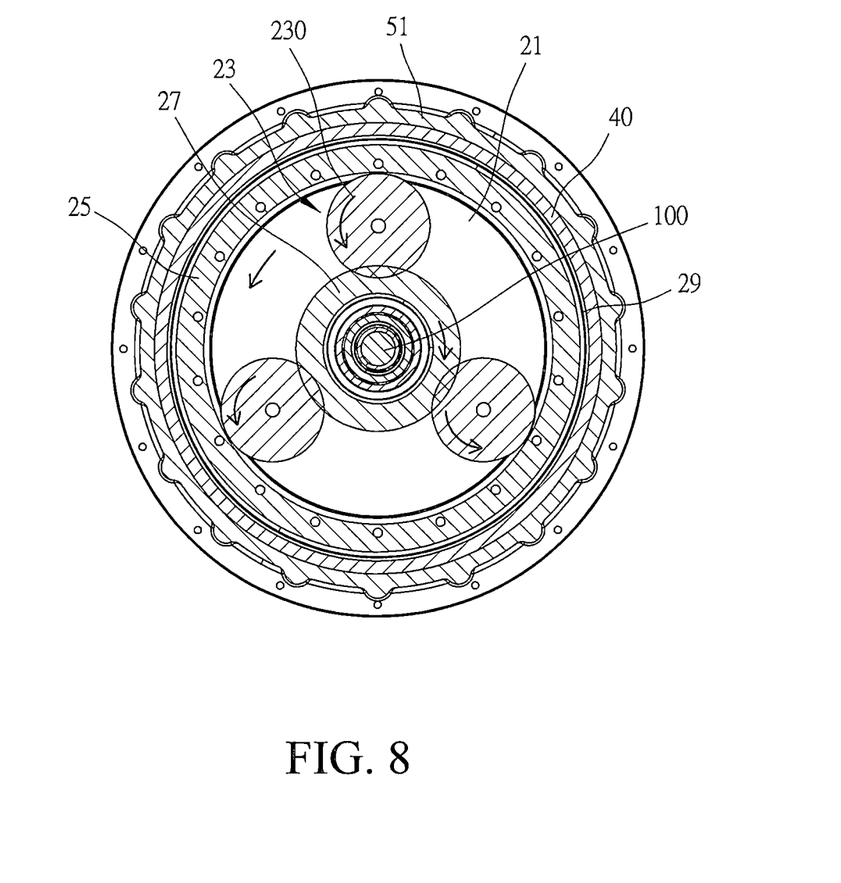
FIG. 8 is a cross-sectional view of present invention, taken from line B-B of FIG. 2.

As shown in FIGS. 2, 3, and 4, the first speed-change assembly 20 is arranged between the main axle 100 and a corresponding end of the input sleeve 11 that extends out of the motor assembly 10. The first speed-change assembly 20 comprises a first carrier frame 21 that is fixed to the end of the input sleeve 11 by a sleeve fastener 16. The first carrier frame 21 has two opposite surfaces on which a first planet group 22 and a second planet group 23 are respectively arranged. The first and second planet groups 22, 23 each comprise a plurality of first planets 220 and second planets 230 of the same contour. The first and second planets 220, 230 are respectively fastened to each other, so that the first and second planets 220, 230 are individually rotatable (spinning), in the same direction and in a synchronized manner, on the first carrier frame 21. Further, a first sun gear 24 is fixed on the main axle 100 and in mating engagement with each of the first planets 220 of the first planet group 22 (as shown in FIG. 7). A first shell 25 is rotatably mounted on an outer circumference of the first carrier frame 21 by means of bead groups on two sides thereof. One side of the first shell 25 that is opposite to the second speed-change assembly 30 is provided with a shell cover 250 fastened thereto for constraining or positioning the bead groups, and on a surface of an opposite side of the first shell 25, a transmission wheel disc 26 that is rotatably mounted on the input sleeve 11 is fixed. The transmission wheel disc 26 is provided, on a center thereof, with a second sun gear 27 and a third sun gear 28 that are respectively arranged on two opposite sides thereof, wherein the second sun gear 27 of the transmission wheel disc 26 is in mating engagement with each of the second planets 230 of the second planet group 23 (as shown in FIG. 8). The third sun gear 28 of the transmission wheel disc 26 is connected with the second speed-change assembly 30, so that an input power that is input through the input sleeve 11 is transmitted through the first speed-change assembly 20 to the second speed-change assembly 30. A first one-way clutching element 29 is fit on an outer circumference of the first shell 25 (as shown in FIG. 7). The first one-way clutching element 29 is operable in either the forward direction or the backward direction, and in the present invention, a primary example for implementing the first one-way clutching element 29 is operating in the forward direction and idling in the backward direction. The output shell 40 is fit on an outer circumference of the first one-way clutching element 29, so that the input power is transmitted through the input sleeve 11, the first and second planet groups 22, 23 of the first carrier frame 21, the transmission wheel disc 26, the first shell 25, and the first one-way clutching element 29 to be outputted through the output shell 40.

Figure 6:
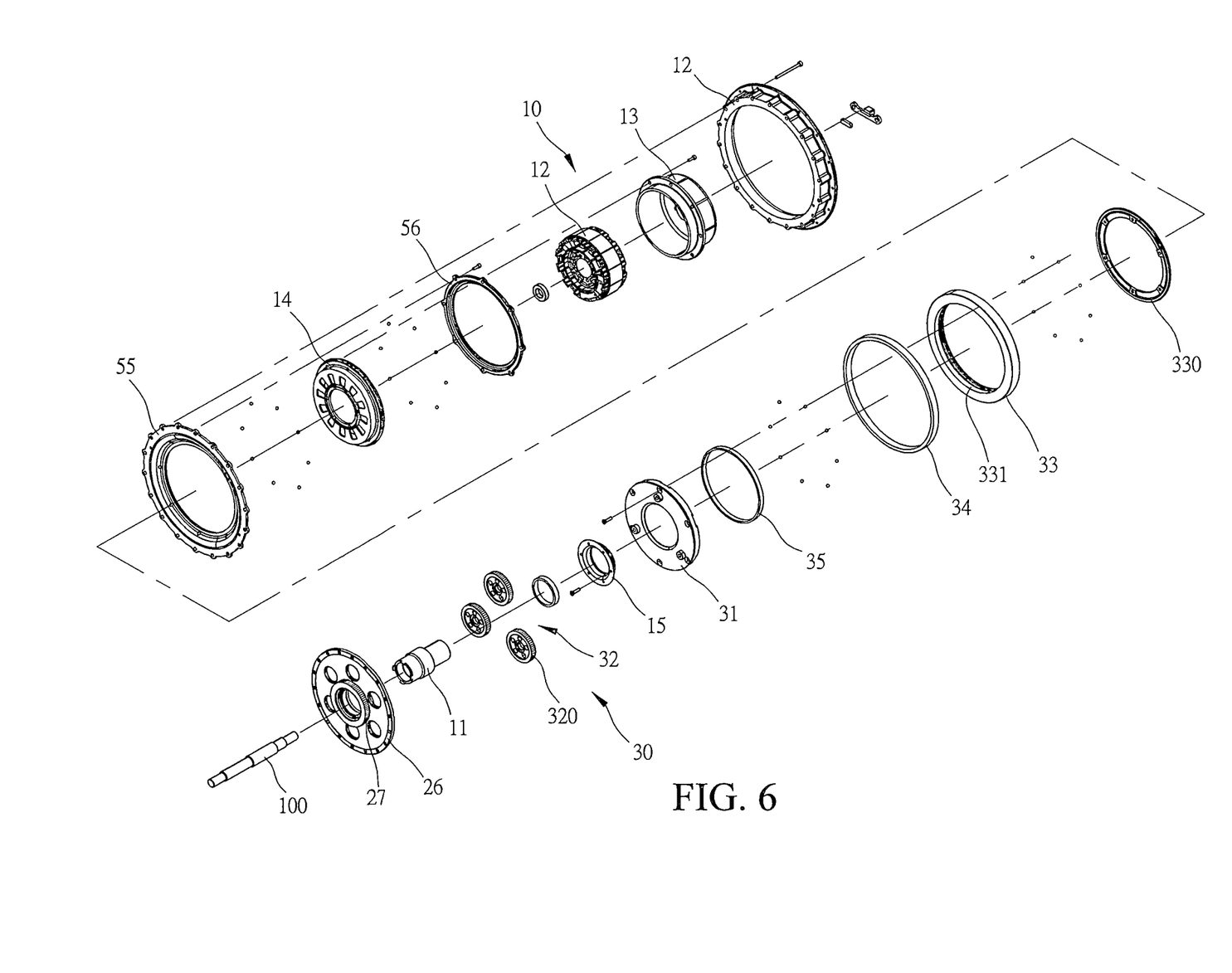
FIG. 6 is an exploded view, taken from a different angle, showing the components and configurations of the second speed-change assembly of the present invention.
Figure 10:
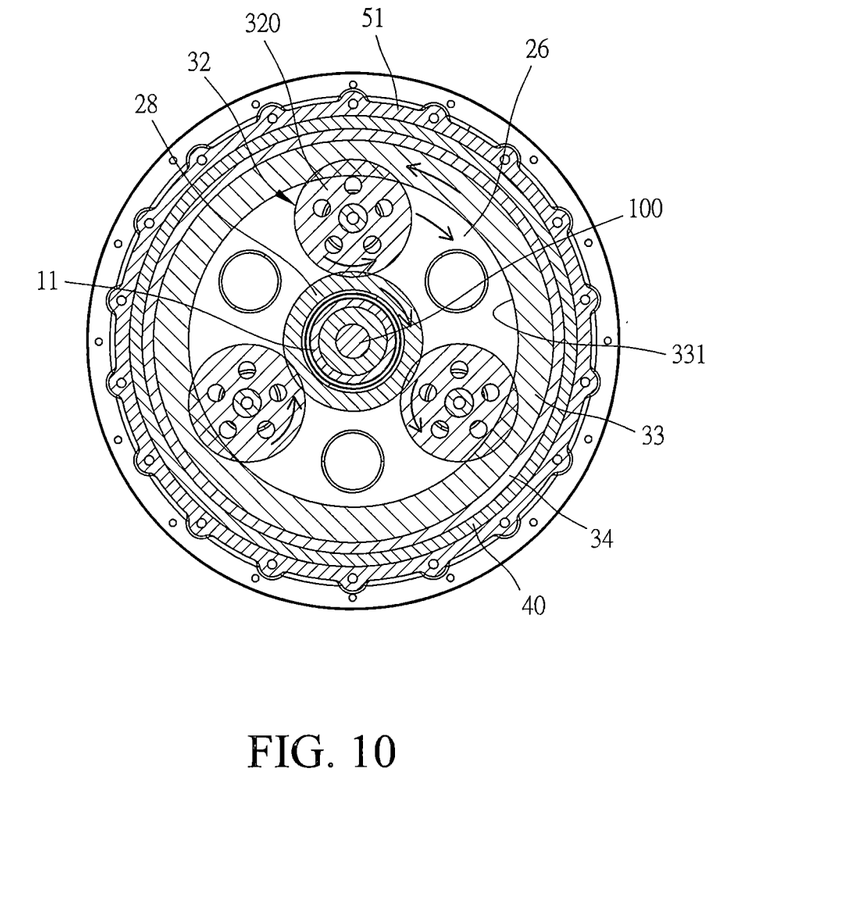
FIG. 10 is a cross-sectional view of present invention, taken from line D-D of FIG. 2.

As shown in FIGS. 2, 5, and 6, the second speed-change assembly 30 is arranged between the first speed-change assembly 20 and the motor assembly 10. The second speed-change assembly 30 comprises a second carrier frame 31 that is mounted on the axle seat 15 of the motor assembly 10. A third planet group 32 is arranged on a surface of the second carrier frame 31 that corresponds to the first speed-change assembly 20, and the third planet group 32 comprises a plurality of third planets 320 that are of the same contour. Each of the third planets 320 of the third planet group 32 is in mating engagement with the third sun gear 28 of the transmission wheel disc 26 of the first speed-change assembly 20, so that the transmission wheel disc 26 drives each of the third planets 320 of the third planet group 32 to rotate. Further, a second shell 33 is rotatably mounted on an outer circumference of the second carrier frame 31 by means of bead groups on two sides thereof. One side of the second carrier frame 31 that is opposite to the first speed-change assembly 20 is provided with a shell cover 330 fastened thereto for constraining or positioning the bead groups, and the second shell 33 is provided, on an inner circumference thereof, with an internal ring toothed section 331 that is in mating engagement with an outer circumferential of each of the third planets 320 (as shown in FIG. 10), so that the third planet group 32 drives, by means of each of the third planets 320, the second shell 33. Further, a second one-way clutching element 34 is fit to an outer circumference of the second shell 33, and the second one-way clutching element 34 is a one-way clutching element that is operable in the same direction as the above-mentioned first one-way clutching element 29. An outer circumference of the second one-way clutching element 34 is joined with the output shell 40, so that the input power is transmitted through the input sleeve 11, the first and second planet groups 22, 23 of the first carrier frame 21, the transmission wheel disc 26, the third planet group 32 of the second carrier frame 31, the second shell 33, and the second one-way clutching element 34 to output through the output shell 40. According to some embodiments, a third one-way clutching element 35 is arranged between the second carrier frame 31 of the second speed-change assembly 30 and the internal motor housing 14 of the motor assembly 10, and the third one-way clutching element 35 is a one-way clutching element that is operable in the same direction as the above-mentioned first and second one-way clutching elements 29, 34. In case that an input power is inputted, in a reversed direction, from the output shell 40, the second speed-change assembly 30 is in idling rotation with respect to the motor assembly 10 so as not to affect internal components thereof.

According to some embodiments, as shown in FIGS. 2-6, the two-stage speed-change output device according to the present invention is applicable to a wheel hub assembly 50 of an electric vehicle. The wheel hub assembly 50 comprises a first wheel hub shell 51, a second wheel hub shell 52, and an internal wheel hub shell 55. Fasteners are applied to fix, in sequence, outer flanges or rims of the first wheel hub shell 51, the output shell 40, the internal wheel hub shell 55, and the second wheel hub shell 52, wherein the first wheel hub shell 51 is rotatably mounted, at a center thereof, on the main axle 100, and the internal wheel hub shell 55 is rotatably mounted, on an inner circumference thereof, on an outer circumference of the internal motor housing 14 of the motor assembly 10 by means of bead groups on two sides thereof. One side of the internal wheel hub shell 55 that is opposite to the second speed-change assembly 30 is provided with a wheel hub cover 56 fastened thereto for constraining or positioning the bead groups. Further, outer flanges of the first wheel hub shell 51 and the second wheel hub shell 52 are provided for connecting a plurality of spokes (not shown) of the vehicle wheel rim, so that the two-stage speed-change output device according to the present invention may be applied to drive a wheel of the electric vehicle and also to conduct switching or changing of speed at the same time.

Further, the first and second speed-change assemblies 20, 30 may fulfill increase or decrease of speed by means of gear ratios between the first planet group 22, the second planet group 23, and the third planet group 32 with respect to the first sun gear 24, the second sun gear 27, and the third sun gear 28 respectively. For example, the first speed-change assembly 20 may be assumed for a high-speed operation, while the second speed-change assembly 30 is set for a mode of low-speed operation, or alternatively, the first speed-change assembly 20 is set for low-speed operation, while the second speed-change assembly 30 assumes a mode for high-speed operation.

In this way, the two-stage speed-change output device that features a small amount of occupied space and exhibiting same direction output and speed changing is constructed.

Figure 9:
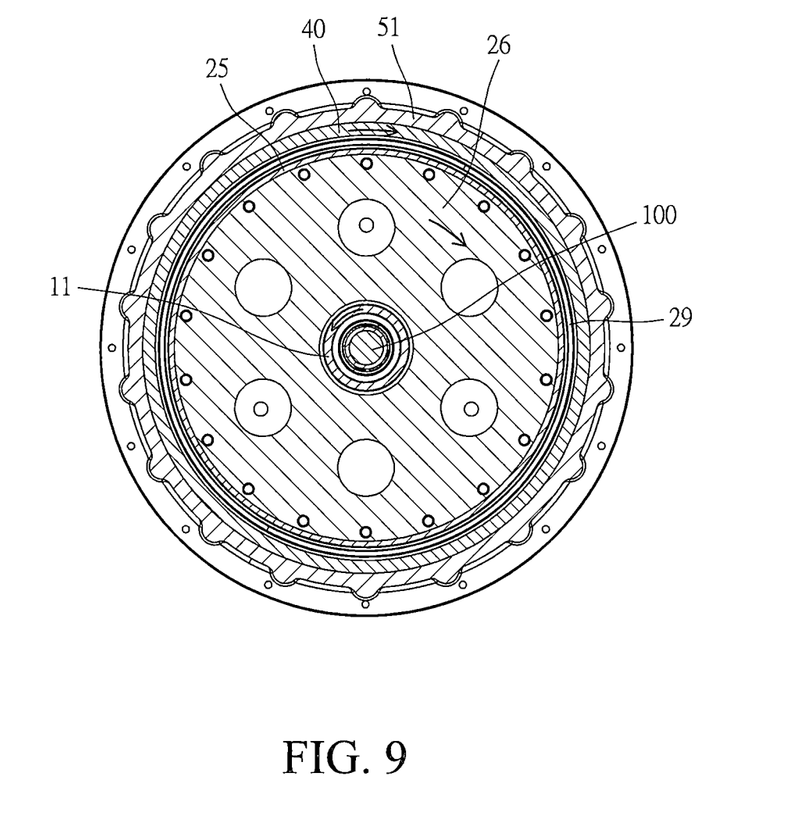
FIG. 9 is a cross-sectional view of present invention, taken from line C-C of FIG. 2.

In a practical operation of the two-stage speed-change output device according to the present invention as being applied to the wheel hub assembly 50 of the electric vehicle, as shown in FIG. 2, the counterclockwise direction is taken as the backward or reverse direction, while the clockwise direction is set as the forward direction. Observing in a direction from the right side, when the motor assembly 10 drives the input sleeve 11 in the backward direction, the input sleeve 11 simultaneously drives the first carrier frame 21 of the first speed-change assembly 20 to rotate in the backward direction. Since the first sun gear 24 is fixed, in an immobile manner, on the main axle 100, the first planet group 22 of the first carrier frame 21 rotates (orbits) around the first sun gear 24 in the backward direction, and each of the first planets 220 rotates (spins) synchronously in the backward direction (as shown in FIG. 7). Since each individual one of the first planets 220 of the first planet group 22 and each corresponding one of the second planets 230 of the second planet group 23 are fixed together, the second planet group 23 and each of the second planets 230 are also forced to rotate (orbit) in the backward direction and rotating (spinning) in the backward direction, so that each of the second planets 230 of the second planet group 23 synchronously drives the second sun gear 27 of the transmission wheel disc 26 that is rotatably mounted on the input sleeve 11 to rotate in the forward direction (as shown in FIG. 8), thereby making the transmission wheel disc 26 synchronously drive the first shell 25 that is fit to the outer circumference of the first carrier frame 21 to rotate in the forward direction. Since the first one-way clutching element 29 mounted on the first shell 25 is operating in the forward direction, the first shell 25 drives, by means of the first one-way clutching element 29, the output shell 40 to do outputting in the forward direction (as shown in FIG. 9). Further, since the first and second wheel hub shells 51, 52 and the internal wheel hub shell 55 of the wheel hub assembly 50 are fastened to the output shell 40, the purpose of driving the wheel of the electric vehicle to rotate can be achieved by means of driving the wheel hub assembly 50. Also, the transmission wheel disc 26 that is caused to rotate in the forward direction makes the third sun gear 28 arranged thereon to synchronously rotate in the forward direction, so that each of the third planets 320 of the third planet group 32 that is in mating engagement with the third sun gear 28 is caused to synchronously rotate (spin) in the backward direction. Since each of the third planets 320 of the third planet group 32 is in mating engagement with the internal ring toothed section 331 of the second shell 33 of the second speed-change assembly 30, a power is developed for intending to drive the second carrier frame 31 of the third planet group 32 to rotate in the forward direction, yet due to the second carrier frame 31 being fit to the internal motor housing 14 of the motor assembly 10 by means of the third one-way clutching element 35 that is operable in the forward direction (and thus becoming fixed in this case), the second carrier frame 31 is kept fixed by the internal motor housing 14 in an immobile condition, so that each of the third planets 320 of the third planet group 32 is rotating in the backward direction and synchronously driving the second shell 33 to rotate in the backward direction (as shown in FIG. 10). Since the second one-way clutching element 34 that is mounted to the second shell 33 is operable in the forward direction, the second shell 33 rotating in the backward direction become freewheeling or idle-rotating with respect to the output shell 40 by means of the second one-way clutching element 34. Thus, when the motor assembly 10 drives the input sleeve 11 to rotate in the backward direction, it is only the first speed-change assembly 20 that drives the output shell 40, while the second speed-change assembly 30 is set in an idling, and thus non-driving, condition.

When the motor assembly 10 drives the input sleeve 11 to rotate in the forward direction, the input sleeve 11 synchronously drives the first carrier frame 21 of the first speed-change assembly 20 to rotate in the forward direction. Since the first sun gear 24 is fixed, in an immobile condition, on the main axle 100, the first planet group 22 of the first carrier frame 21 is caused to rotate (orbit) around the first sun gear 24 in the forward direction, and each of the first planets 220 synchronously rotates (spins) in the forward direction. Since each individual one of the first planets 220 of the first planet group 22 and each corresponding one of the second planets 230 of the second planet group 23 are fixed together, the second planet group 23 and each of the second planets 230 are also caused to orbit in the forward direction and spinning in the forward direction, so that each of the second planets 230 of the second planet group 23 synchronously drives the second sun gear 27 of the transmission wheel disc 26 that is rotatably mounted on the input sleeve 11 to rotate in the backward direction, making the transmission wheel disc 26 synchronously drive the first shell 25 that is rotatably fit to the outer circumference of the first carrier frame 21 to rotate in the backward direction. Since the first one-way clutching element 29 that is fit to the first shell 25 is operable in the forward direction, the first shell 25 rotating in the backward direction becomes freewheeling or idle-rotating with respect to the output shell 40 by means of the first one-way clutching element 29. Also, the third sun gear 28 that is arranged on the transmission wheel disc 26 that is rotating in the backward direction is caused to synchronously rotate in the backward direction, so that each of the third planets 320 of the third planet group 32 that is in mating engagement with the third sun gear 28 is caused to synchronously rotate (spin) in the forward direction. Since each individual one of the third planets 320 of the third planet group 32 is in mating engagement with the internal ring toothed section 33 of the second shell 331 of the second speed-change assembly 30, assuming a power-outputting condition, so as to drive the second carrier frame 31 on which the third planet group 32 is arranged to rotate in the forward direction. However, since the second carrier frame 31 is fit to the internal motor housing 14 of the motor assembly 10 by means of the third one-way clutching element 35 that is operable in the forward direction (and thus becoming fixed in this case), the second carrier frame 31 is kept fixed by the internal motor housing 14 in an immobile condition, so that each of the third planets 320 of the third planet group 32 synchronously drives the second shell 33 to rotate in the forward direction. Since the second one-way clutching element 34 that is mounted to the second shell 33 is operable in the forward direction, the second shell 33 rotating in the forward direction drives, by means of the second one-way clutching element 34, the output shell 40 to rotate and output in the forward direction. Further, since the first and second wheel hub shells 51, 52 and the internal wheel hub shell 55 of the wheel hub assembly 50 and the output shell 40 are fastened together, the purpose of driving the wheel of the electric vehicle to rotate can be achieved by means of driving the wheel hub assembly 50. Thus, when the motor assembly 10 drives the input sleeve 11 to rotate in the forward direction, it is only the second speed-change assembly 30 that drives the output shell 40, while the first speed-change assembly 20 is set in an idling, and thus non-driving, condition.

When the electric vehicle is backed up and moving reversely, as shown in FIGS. 2 and 7-10, the wheel is caused by a frictional force thereof with respect to a road surface to force the wheel hub assembly 50 to rotate in the backward direction, and therefore, the first and second wheel hub shells 51, 52 of the wheel hub assembly 50 drives the output shell 40 to rotate in the backward direction. Since the first and second one-way clutching elements 29, 34 of the first and second speed-change assemblies 20, 30 that are mounted to an inner circumference of the output shell 40 are both a one-way clutching element that is of an arrangement that, considering transmission in a direction from inside toward outside, is operable in the forward direction and idling in the backward direction, so that when the output shell 40 rotates backward, as being transmitted reversely from outside to inside, the first and second one-way clutching elements 29, 34 oppositely drive, in the backward direction, the first shell 25 of the first speed-change assembly 20 and the second shell 33 of the second speed-change assembly 30 respectively corresponding thereto to rotate in the backward direction, wherein the first shell 25 of the first speed-change assembly 20 that rotates in the backward direction synchronously drives the transmission wheel disc 26 and thus the third sun gear 28 to rotate in the backward direction, therefore driving each of the third planets 320 of the third planet group 32 in mating engagement therewith to rotate (spin) in the forward direction; and the second shell 33 of the second speed-change assembly 30 that is also rotating in the backward direction drives each of the third planets 320 of the third planet group 32 in mating engagement with the internal ring toothed section 331 thereof to rotate (spin) in the backward direction, and therefore, a situation of immobility is developed due to the operations of the two are in opposite directions, this making it impossible for the electric vehicle to back up. Since each of the third planets 320 of the third planet group 32 is mounted on the second carrier frame 31 and since the second carrier frame 31 is fit to the internal motor housing 14 of the motor assembly 10 by means of the third one-way clutching element 35, so that the second carrier frame 31 is set in a fixed, immobile condition in the forward direction, yet freewheeling or idle-rotating in the backward direction. This makes the second carrier frame 31 unidirectionally rotatable, and not affected by the third planets 320 of the third planet group 32 being fixed, and thus, driving through two-stage speed-change output of power is achievable and the electric vehicle is allowed to back up.

By means of the arrangement and description provided above, the motor assembly 10 of the two-stage speed-change output device according to the present invention may make use of rotation in either the backward direction or the forward direction to respectively drive the first and second speed-change assemblies 20, 30, so as to make the first and second speed-change assemblies 20, 30 respectively drive the first and second one-way clutching elements 29, 34 to drive the output shell 40 in the same direction, allowing the two-stage speed-change output device of the present invention to be operable for switching with two stages of speed change by using the forward and backward rotations of the motor assembly 10, exhibiting advantages of being easy to operate, occupying a relatively small amount of space, and being applicable to driving and speed changing for a small-sized electric vehicle, and thus practical utilization thereof can be greatly enhanced.

I claim:

1. A two-stage speed-change output device, comprising:
a main axle;
a motor assembly;
a first speed-change assembly; and
a second speed-change assembly mounted on the main axle, the first speed-change assembly and the second speed-change assembly being mounted inside an output shell by means of a first one-way clutching element and a second one-way clutching element that are operable in a forward direction, wherein the motor assembly is operable to rotate in a backward direction to drive the first one-way clutching element of the first speed-change assembly to drive the output shell to rotate in the forward direction and to drive the second one-way clutching element of the second speed-change assembly to idle with respect to the output shell, and the motor assembly is also operable to rotate in the forward direction to drive the second one-way clutching element of the second speed-change assembly to drive the output shell to rotate in the forward direction and to drive the first one-way clutching element of the first speed-change assembly to idle with respect to the output shell, wherein the two-stage speed-change output device is operable to switch for two-stage speed change in driving the output shell in a same direction with rotations of the motor assembly in the forward and backward directions; and wherein the motor assembly comprises an input sleeve rotatably mounted on the main axle, an electromagnetic mechanism that is excitable through energization being mounted on one end of the input sleeve, wherein the input sleeve is driven, by means of the electromagnetic mechanism being energized and excited, to rotate in one of the forward direction and backward direction relative to the main axle, and wherein the motor assembly comprises an external motor housing arranged on the main axle at an outer side of the electromagnetic mechanism, and the motor assembly further comprises an internal motor housing that is arranged at an inner side of the electromagnetic mechanism and is combined with the external motor housing, an axle seat being fit in a center of the internal motor housing and rotatably mounted on the input sleeve.

2. The two-stage speed-change output device according to claim 1, wherein the first speed-change assembly comprises a first carrier frame fixedly mounted on the input sleeve, the first carrier frame having two surfaces on which a first planet group and a second planet group are respectively arranged, the first and second planet groups respectively comprising a plurality of first planets and second planets that are of same contours and are rotatably mounted on the first carrier frame and synchronously in a same direction, the first planet group further comprising a first sun gear that is fixedly mounted on the main axle and in mating engagement with each of the first planets, a first shell being rotatably mounted to an outer circumference of the first carrier frame, the first one-way clutching element being fixed to an outer circumference of the first shell, a transmission wheel disc being fixedly mounted to the first shell and rotatably mounted on the input sleeve, a second sun gear and a third sun gear being respectively formed on two surfaces of the transmission wheel disc at a center thereof, wherein the second sun gear is in mating engagement with each of the second planets of the second planet group, and the third sun gear is connected to and drives the second speed-change assembly.

3. The two-stage speed-change output device according to claim 2, wherein the second speed-change assembly is arranged between the first speed-change assembly and the motor assembly, and the second speed-change assembly comprises a second carrier frame mounted to the axle seat of the motor assembly, a third planet group being arranged on a surface of the second carrier frame that corresponds to the first speed-change assembly, the third planet group comprising a plurality of third planets that are of a same contour and are rotatably mounted on the second carrier frame, each of the third planets being in mating engagement with the third sun gear of the transmission wheel disc of the first speed-change assembly, a second shell being rotatably mounted to an outer circumference of the second carrier frame, an internal ring toothed section being arranged on an inner circumference of the second shell and in mating engagement with an outer circumference of each of the third planets, the second one-way clutching element being fixedly mounted on an outer circumference of the second shell.

4. The two-stage speed-change output device according to claim 3, wherein a third one-way clutching element is arranged between the second speed-change assembly and the internal motor housing of the motor assembly, and the third one-way clutching element and the first and second one-way clutching elements are one-way clutching elements that are operable in a same direction, wherein when an input power is inputted reversely from the output shell, the second speed-change assembly is idling with respect to the motor assembly.

5. The two-stage speed-change output device according to claim 3, wherein the first and second speed-change assemblies are operable for increasing or decreasing speed by using gear ratios between the first planet group, the second planet group, and the third planet group with respect to the first sun gear, the second sun gear, and the third sun gear corresponding thereto.

6. A wheel hub assembly of an electric vehicle, the wheel hub assembly comprising the two-stage speed-change output device according to claim 1, the two-stage speed-change output device being operable to drive the wheel hub assembly and simultaneously conduct switching for speed change, wherein the wheel hub assembly comprises a first wheel hub shell, a second wheel hub shell, and an internal wheel hub shell, which are fastened together by means of at least one fastener, at least one of the first wheel hub shell, the internal wheel hub shell, and the second wheel hub shell being fastened to the output shell, and wherein the first wheel hub shell is rotatably mounted, at a center thereof, on the main axle, and the internal wheel hub shell is rotatably mounted on an outer circumference of the internal motor housing of the motor assembly.

* * * * *